United States Patent
Johri et al.

(10) Patent No.: US 9,959,423 B2
(45) Date of Patent: May 1, 2018

(54) SECURITY AND DATA ISOLATION FOR TENANTS IN A BUSINESS DATA SYSTEM

(75) Inventors: Vijeta Johri, Bellevue, WA (US);
Amar Nalla, Redmond, WA (US);
Madan G. Natu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 832 days.

(21) Appl. No.: 13/561,113

(22) Filed: Jul. 30, 2012

(65) Prior Publication Data

US 2014/0032228 A1 Jan. 30, 2014

(51) Int. Cl.
*G06F 21/62* (2013.01)

(52) U.S. Cl.
CPC ................ *G06F 21/6227* (2013.01)

(58) Field of Classification Search
CPC combination set(s) only.
See application file for complete search history.

(56) References Cited

U.S. PATENT DOCUMENTS

| 6,487,552 B1 | 11/2002 | Lei et al. |
| 6,587,854 B1 | 7/2003 | Guthrie et al. |
| 2005/0223022 A1 | 10/2005 | Weissman et al. |
| 2007/0143546 A1* | 6/2007 | Narad .......................... 711/130 |
| 2008/0244184 A1 | 10/2008 | Lewis et al. |
| 2010/0125612 A1 | 5/2010 | Amradkar et al. |
| 2010/0138830 A1* | 6/2010 | Astete et al. ..................... 718/1 |
| 2011/0106802 A1 | 5/2011 | Pinkney et al. |
| 2011/0179008 A1 | 7/2011 | Talius |
| 2011/0270832 A1 | 11/2011 | Le Stum |

FOREIGN PATENT DOCUMENTS

| CN | 101639835 A | 2/2010 |
| CN | 103177059 A | 6/2013 |
| CN | 103177061 A | 6/2013 |
| CN | 103177063 A | 6/2013 |
| JP | 2000-076193 A | 3/2000 |
| JP | 2007-531941 A | 11/2007 |
| JP | 2009-145972 A | 7/2009 |
| JP | 2010-026653 A | 2/2010 |
| JP | 2010-524083 A | 7/2010 |
| WO | 01/77787 A2 | 10/2001 |
| WO | 2011053834 A2 | 5/2011 |

OTHER PUBLICATIONS

Chong, et al., "Multi-Tenant Data Architecture", retrieved at <<http://msdn.microsoft.com/en-us/library/aa479086.aspx>> Jun. 2006, pp. 17.

(Continued)

*Primary Examiner* — Maria C Santos-Diaz
(74) *Attorney, Agent, or Firm* — Christopher J. Volkmann; Kelly, Holt & Christenson, PLLC

(57) ABSTRACT

A multi-tenant hosting system receives business data and tenant-identifying data, from a tenant. The data from multiple different tenants is stored on a single database, but the data corresponding to each tenant is partitioned by marketing the data with a partition identifier, within the database. Therefore, the hosting system only allows individual tenants to have access to their own data.

20 Claims, 20 Drawing Sheets

(56) References Cited

OTHER PUBLICATIONS

Piplani, Amit, "Multi-Tenancy Security Approach", retrieved at <<http://amitpiplani.blogspot.in/2009/09/multi-tenancy-security-approach.html>> Sep. 23, 2009, pp. 3.

Weeks, et al., "NetApp MultiStore—Security and Mobility for Cloud Storage", Retrieved at <<http://media.netapp.com/documents/tot-1001.pdf>> In the proceedings of Tech OnTap, Jan. 2010, pp. 8.

Taylor, et al., "Data Integration and Composite Business Services, Part 3: Build a multi-tenant data tier with access control and security", retrieved at <<http://www.ibm.com/developerworks/data/library/techarticle/dm-0712taylor/>> Dec. 13, 2007, pp. 10.

Machiraju, et al., "Designing Multitenant Applications on Windows Azure", Retrieved at <<http://msdn.microsoft.com/en-us/library/windowsazure/hh689716.aspx>> Retrieved Date: Jun. 29, 2012, pp. 12.

International Search Report and Written Opinion of the International Searching Authority for PCT/US2013/052601 dated Nov. 6, 2013.

Office Action or Japanese Patent Application No. 2015-525498, dated May 31, 2017, 7 pages.

First Office Action for Chinese Patent Application No. 201380040713.4, dated Aug. 11, 2016, 13 pages.

Decision on Rejection for Chinese Patent Application No. 201380040713.4, dated Aug. 31, 2017, 12 pages, no English Translation.

Second Office Action for Chinese Patent Application No. 201360040713.4 dated Apr. 5, 2017, 19 pages.

"Office Action Issued in European Patent Application No. 13745982.2", dated Nov. 15, 2017, 7 Pages.

\* cited by examiner

FIG. 3A

| Table CustTable | |
|---|---|
| Properties | Categories | |
| ID | 77 |
| Name | CustTable |
| Label | Customers |
| FormRef | |
| ListPageRef | |
| ReportRef | |
| PreviewPartRef | |
| SearchLinkRefType | Url |
| SearchLinkRefName | EPCustTableInfo |
| TitleField1 | AccountNum |
| TitleField2 | Party |
| TableType | Regular |
| TableContents | Not specified |
| SystemTable | No |
| ConfigurationKey | LedgerBasic |
| SecurityKey | CustTables |
| Visible | Yes |
| AOSAuthorization | None |
| CacheLookup | Found |
| CreateRecIdIndex | Yes |
| SaveDataPerCompany | Yes |
| SaveDataPerPartition | Yes |
| TableGroup | Main |
| PrimaryIndex | AccountIdx |
| ClusterIndex | AccountIdx |

Per Company Table

213 — Properties tab
211 — Properties panel
215 — highlighted rows

| Table DirPartyEcoResCategory | |
|---|---|
| Properties | Categories |

| | |
|---|---|
| ID | 4071 |
| Name | DirPartyEcoResCategory |
| Label | Set up categories |
| FormRef | |
| ListPageRef | |
| ReportRef | |
| PreviewPartRef | |
| SearchLinkRefType | Url |
| SearchLinkRefName | |
| TitleField1 | Party |
| TitleField2 | relationType |
| TableType | Regular |
| TableContents | Not specified |
| Systemtable | No |
| ConfigurationKey | LogisticsBasic |
| SecurityKey | DirAddressService |
| Visible | Yes |
| ADSAuthorization | None |
| CacheLookup | Found |
| CreateRecIdIndex | Yes |
| SaveDataPerCompany | No |
| SaveDataPerPartition | Yes |
| TableGroup | Main |
| PrimaryIndex | SurrogateKey |
| ClusterIndex | ValidCategory_AK |

Per Partition Table

FIG. 3B

Shared Table (System-Only)

SECURITY AND DATA ISOLATION FOR TENANTS IN A BUSINESS DATA SYSTEM

BACKGROUND

Business organizations often use many different types of business computer programs or applications. Some such programs include enterprise resource planning (ERP) systems, customer resource management (CRM) systems, line of business (LOB) applications, and many other business-related programs.

Many organizations also implement role-based security on their business programs. That is, a user may fulfill a specific role at a company, and a user with that role may have access to certain data, but may not have access to other data. For instance, a user who is in a human resource role may have access to the salaries and personal files of various employees, but may not have access to sales data or other types of general business information. By contrast, a user who is in the role of a sales manager may have access to multiple levels of sales data for the company, across various product lines, but may not have access to personal files and salary information for other employees.

In addition, many companies consider much of their business-related data to be confidential or proprietary. For instance, many companies consider sales records, sales leads, personal file information, and a whole host of other business information to be confidential and proprietary to the company itself. The company does not want other companies, such as competitors, or even related companies, to have access to that data.

In this context, there can arise situations in which companies can become related to one another in certain ways, but in which they still do not wish to share information with one another. For instance, it may be that a company is a holding company that grows by acquiring independent businesses (or subsidiaries). The subsidiaries maintain significant management and operational control over themselves, and the data and processes for each subsidiary are not to be shared among other subsidiaries.

Some current solutions require each of the subsidiaries to have its own separate database for storing its own business data. In other current solutions, each separate subsidiary is given its own, separate, database product. There are totally separate installations of a given business data program for each of the subsidiaries. For example, each subsidiary may have its own, separate, installation of an ERP system.

However, it can also happen that the subsidiaries desire to pool their information technologies (IT) resources and leverage a single business software application. That is, the subsidiaries (or a subset of the subsidiaries) may wish to share the cost of a single business application installation, but they still wish to keep their business data entirely separate and isolated from the other subsidiaries that are sharing the same business application. Similarly, each of the subsidiaries may wish to implement its own role-based security rules, or other security rules.

The discussion above is merely provided for general background information and is not intended to be used as an aid in determining the scope of the claimed subject matter.

SUMMARY

A multi-tenant hosting system receives business data and tenant-identifying data, from a tenant. The data from multiple different tenants is stored on a single database, but the data corresponding to each tenant is partitioned by marking the data with a partition identifier, within the database. Therefore, the hosting system only allows individual tenants to have access to their own data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3C show exemplary user interface displays showing partitioned data in tables.

DETAILED DESCRIPTION

Figure 1:
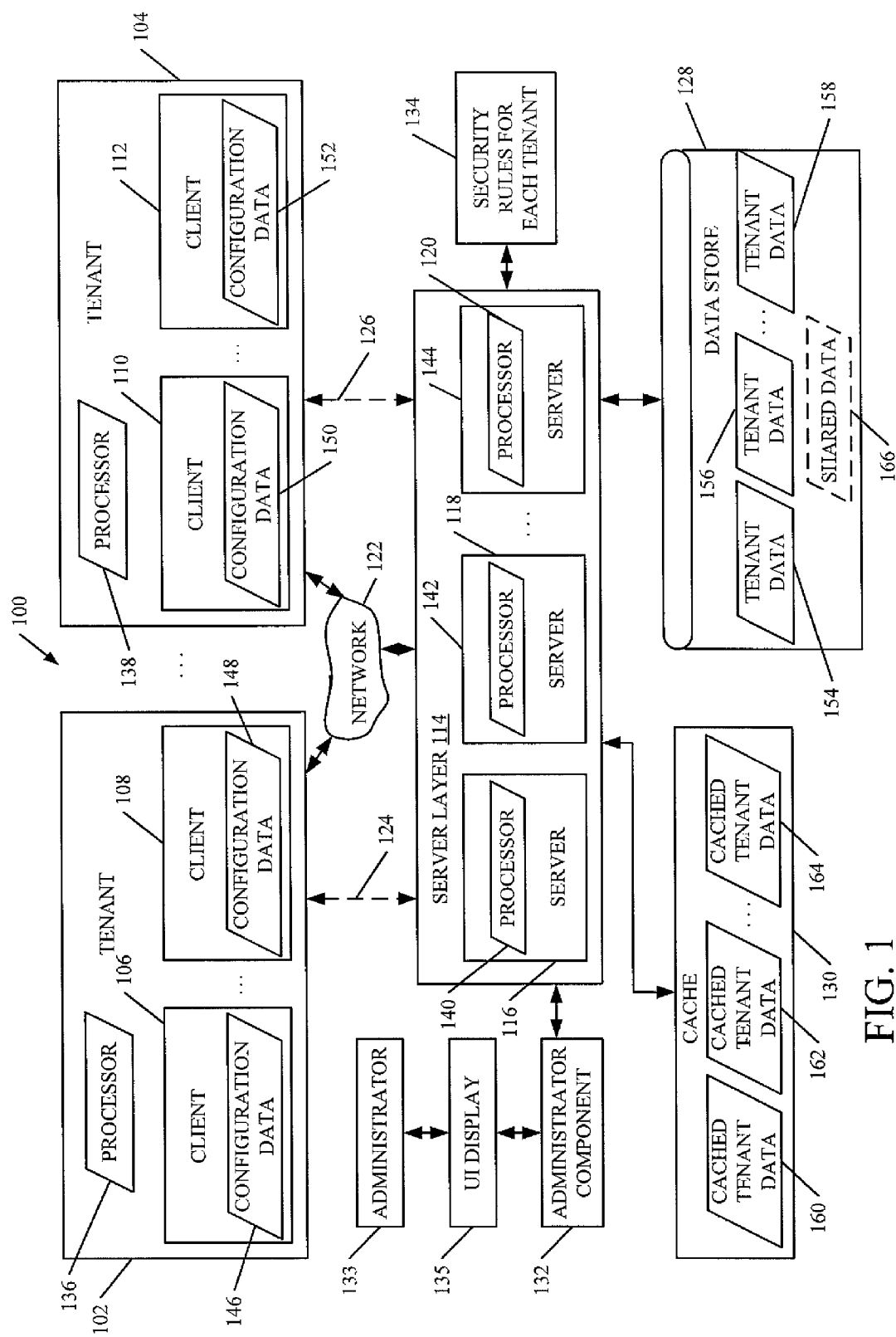
FIG. 1 is a block diagram of one embodiment of a business data system.

FIG. 1 shows a block diagram of one embodiment of a business data system 100. Business data system 100 shows tenants 102 and 104, each of which has a plurality of clients (or users) 106, 108 and 110, 112, respectively. Tenants 102 and 104 have access to server layer 114 which, itself, has a plurality of servers 116, 118 and 120. As shown in FIG. 1, tenants 102 and 104 have access to server layer 114 either through a network 122, or directly, as indicated by arrows 124 and 126, respectively. Server layer 114 services requests (from tenants 102 and 104) to access data stored in data store 128. Server layer 114 also implements caching, using cache 130.

In one embodiment, system 100 also includes an administrator component 132 that can be used by an administrator to set up new tenants in the business data system 100. Each of the new tenants uses the same system (such as the same ERP or CRM installation or other business application installation). In addition, in one embodiment, server layer 114 has access to security rules for each of tenants 102 and 104. The security rules are indicated by block 134. Therefore, server layer 114 can implement security for each tenant 102 and 104. In one embodiment, the security rules define the authentication procedure when clients login to a tenant 102 or 104, and they also define role-based security on a per-tenant basis. Of course, other types of security rules or security procedures can be implemented as well.

FIG. 1 shows that at least each tenant 102 and 104 has a processor 136 and 138. Of course, it will be noted that each client could have its own processor as well, and one processor is shown for each tenant for the sake of simplicity. FIG. 1 also shows that each server 116, 118 and 120 can have its own processor 140, 142 and 144. It will also be noted that server layer 114 can have a single processor accessed by each of the servers, but individual processors for each server are shown for the sake of example. In one embodiment, each of the processors comprises a computer processor with associated memory and timing circuitry (not shown). The processors form a functional part of system 100 and are activated by, and facilitate the functionality of, other components in system 100.

It should also be noted that, while data store 128 is shown as a single data store, it could be implemented as multiple distinct data stores as well, and they can either be located local to server layer 114 or remotely therefrom. Data store 128 is illustratively storage for a single database installation used by all tenants in system 100. Similarly, cache 130 is shown as a single in-memory cache, but it could be implemented in other ways as well, such as in multiple different memories.

Further, FIG. 1 shows that, in one embodiment, each client 106-112 has its own configuration data 146, 148, 150 and 152, respectively. The configuration data illustratively identifies the role of each client and also the specific tenant to which each client belongs. It will be noted that the tenant can have a common set of configuration data for its multiple clients as well, but separate configuration data (or configuration files) for each client are shown by way of example only.

While a detailed description of the operation of system 100 is given below with respect to the remaining figures, an overview is provided now to enhance understanding of the remaining description. System 100 is illustratively representative of a scenario in which tenants 102 and 104 wish to pool information technology resources by using a single ERP application (or other business-related application) and by storing all of their data on a common database 128, but still maintain partitioning of their own individual data so that it cannot be viewed or accessed by other tenants. For instance, in one example, tenants 102 and 104 are both commonly owned business (such as subsidiaries of a parent holding company). In that case, each tenant 102 and 104 illustratively maintains its own management and operational control, and it wishes to have its data securely partitioned from the other tenants. In that case, clients 106-108 correspond to users of the business-related application (such as an ERP application, for instance) used by tenant 102, and clients 110 and 112 correspond to users of the same application used by tenant 104. Tenants 102 and 104 both use the same installation of the business-related application.

When a new organization is added to the holding company (i.e., when a new tenant is added to system 100) an administrator 133 illustratively accesses server layer 114 through administrator component 132. Component 132 illustratively has a user interface component that generates user interface displays 135 that are provided to administrator 133. The user interface displays 135 illustratively include user input mechanisms that allow administrator 133 to provide user inputs to manipulate the business-related application implemented by server layer 114 and used by the various clients of the various tenants of the system. The user input mechanisms can receive user inputs from a point and click device (such as a mouse or track ball), from a keyboard (virtual or hardware), touch gestures where the display screen is a touch sensitive screen, voice inputs, etc. FIG. 2A shows one embodiment of a user interface display 179 that allows an administrator to set up a new tenant. The administrator uses user input mechanisms 181 and 183 to identify and set up (or create) a new tenant.

In order to set up a new tenant, administrator 133 illustratively identifies one of the clients of the new tenant as a security administrator. For instance, assume that tenant 102 is the new tenant to be added. Administrator 133 can identify client 106 as being the security administrator for tenant 102.

Figure 2:
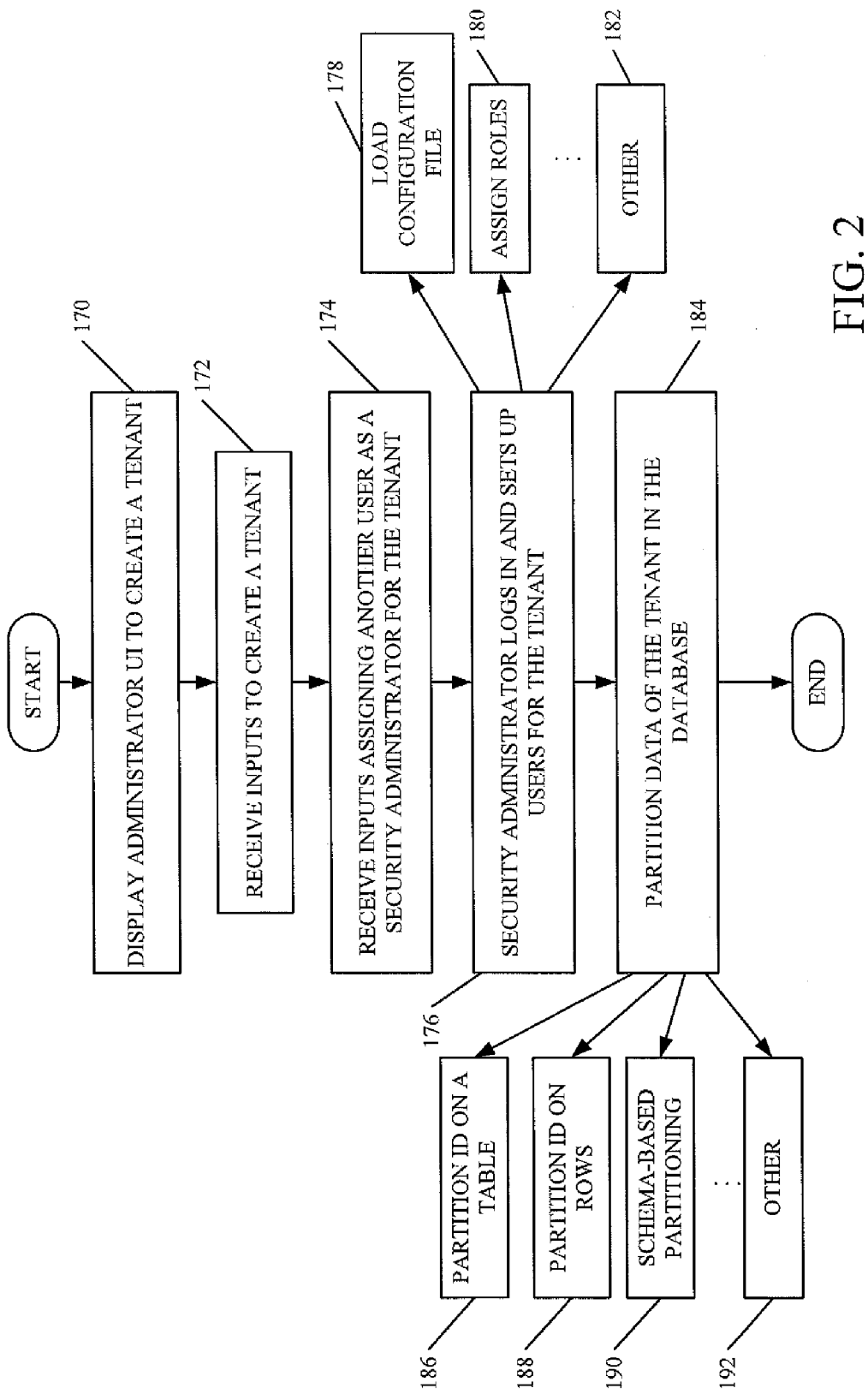
FIG. 2 is a flow diagram illustrating one embodiment of the overall operation of the system shown in FIG. 1 in setting up tenants.
Figure 2A:
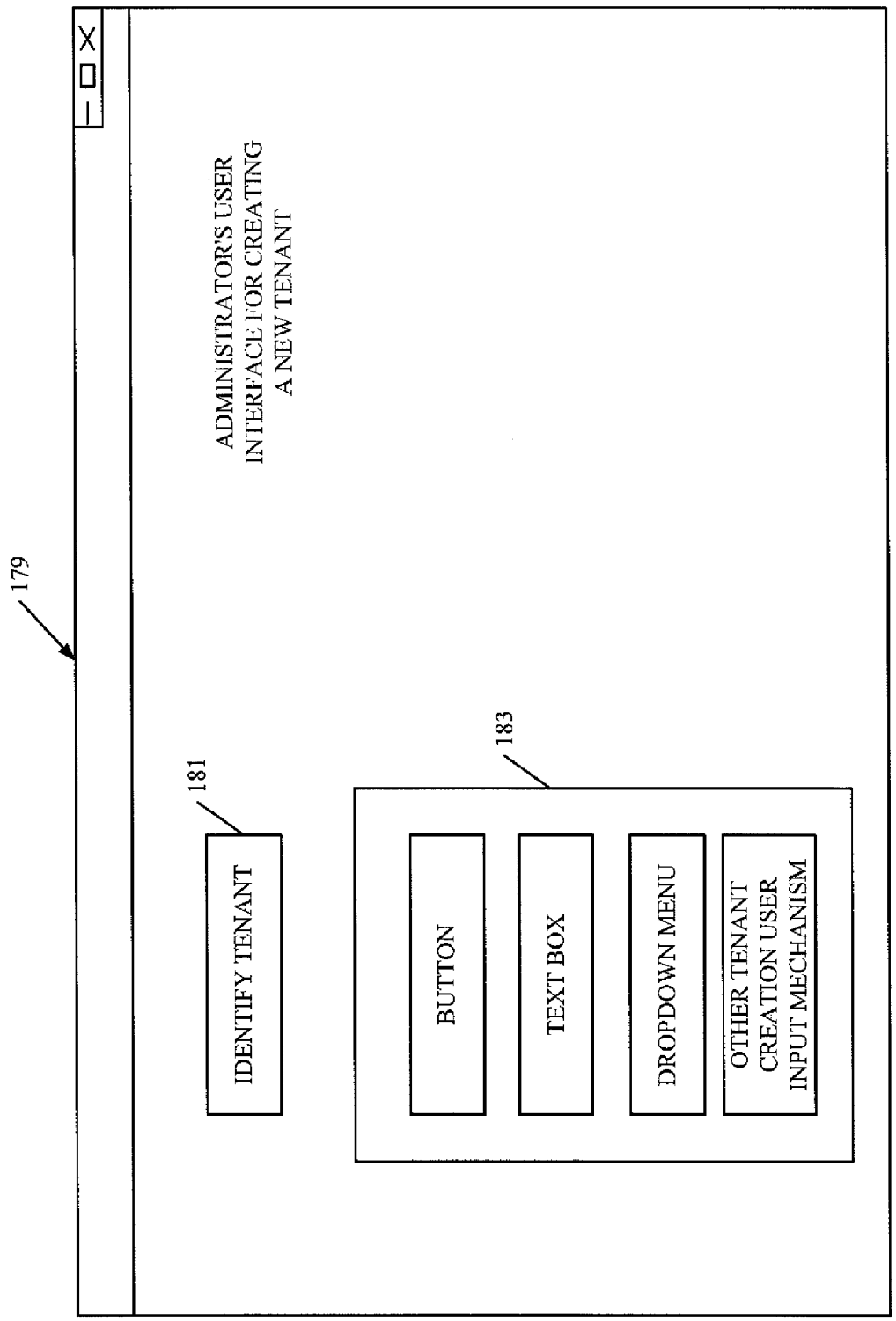
FIGS. 2A-2E show illustrative user interface displays.
Figure 2B:
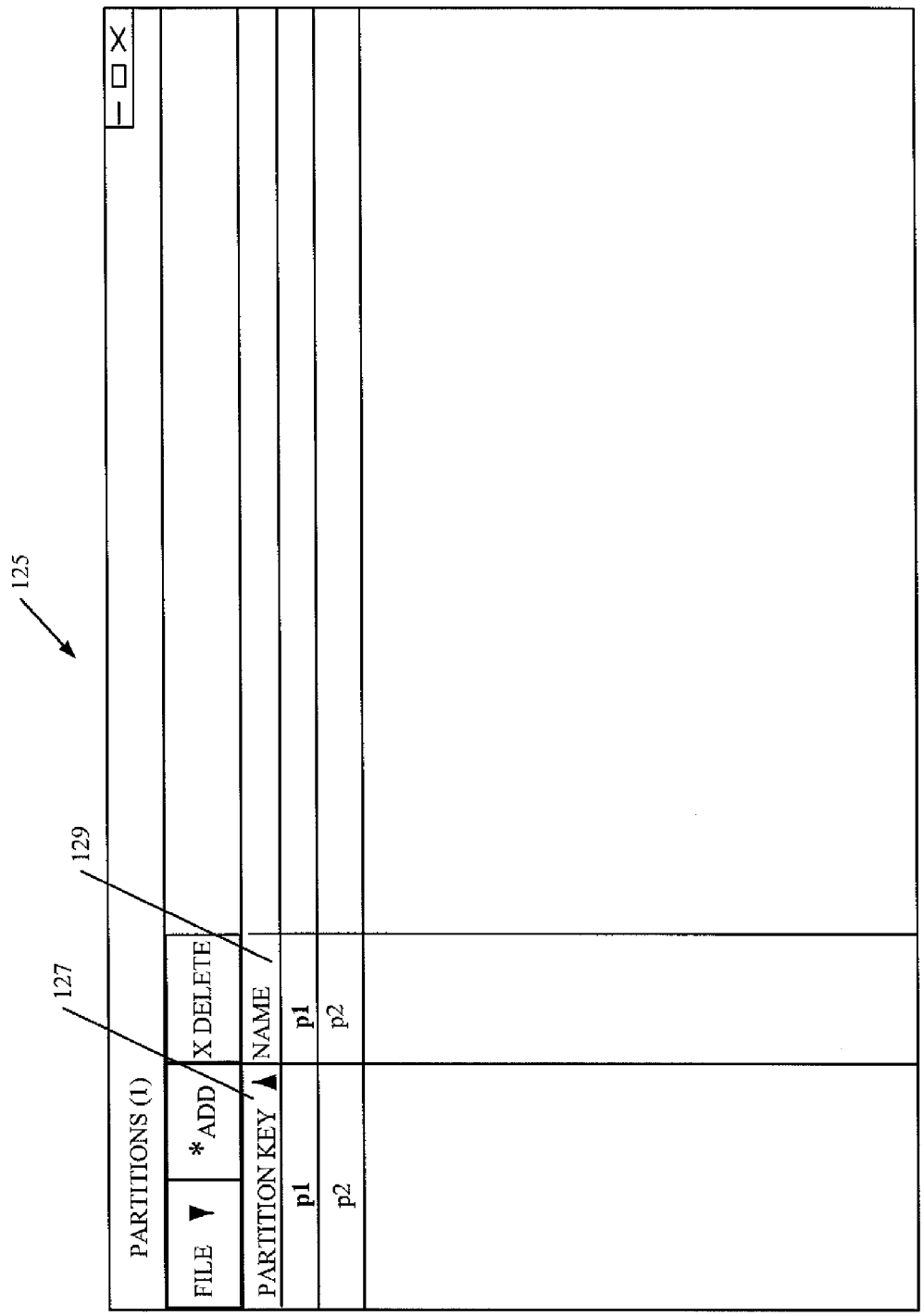

FIG. 2B shows another embodiment of a user interface display 125. Display 125 can be presented to an administrator for creating a new tenant. Display 125 includes a set of columns, comprising a partition key column 127 and a name column 129. The user can select a cell in partition key column 127 and enter a partition key and enter the corresponding partition name in the adjacent cell in column 129. In this way, the administrator can set up tenants (i.e., partitions) that can be used in data store 128 and in cache 130 to partition the data for various clients. It can be seen in FIG. 2B that the partition key column 127 includes three partition keys "initial", "P1", and "P2". The corresponding names are "initial partition", "P1", and "P2", respectively.

Figure 2C:
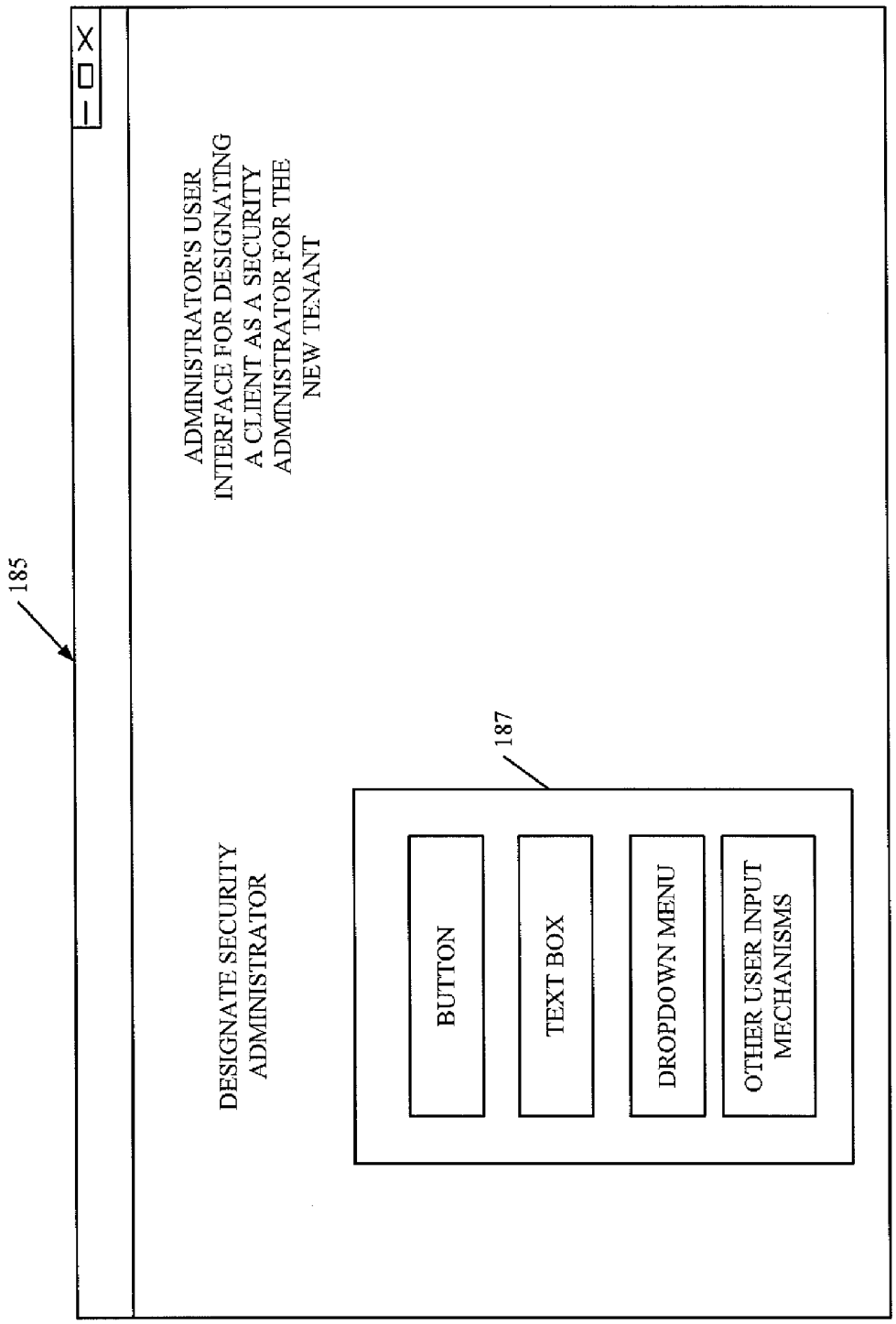

FIG. 2C is one embodiment of a user interface display 185 that allows administrator 133 to designate a client of the new tenant as a security administrator. The administrator can use user input mechanisms 187 to do this.

Figure 2D:
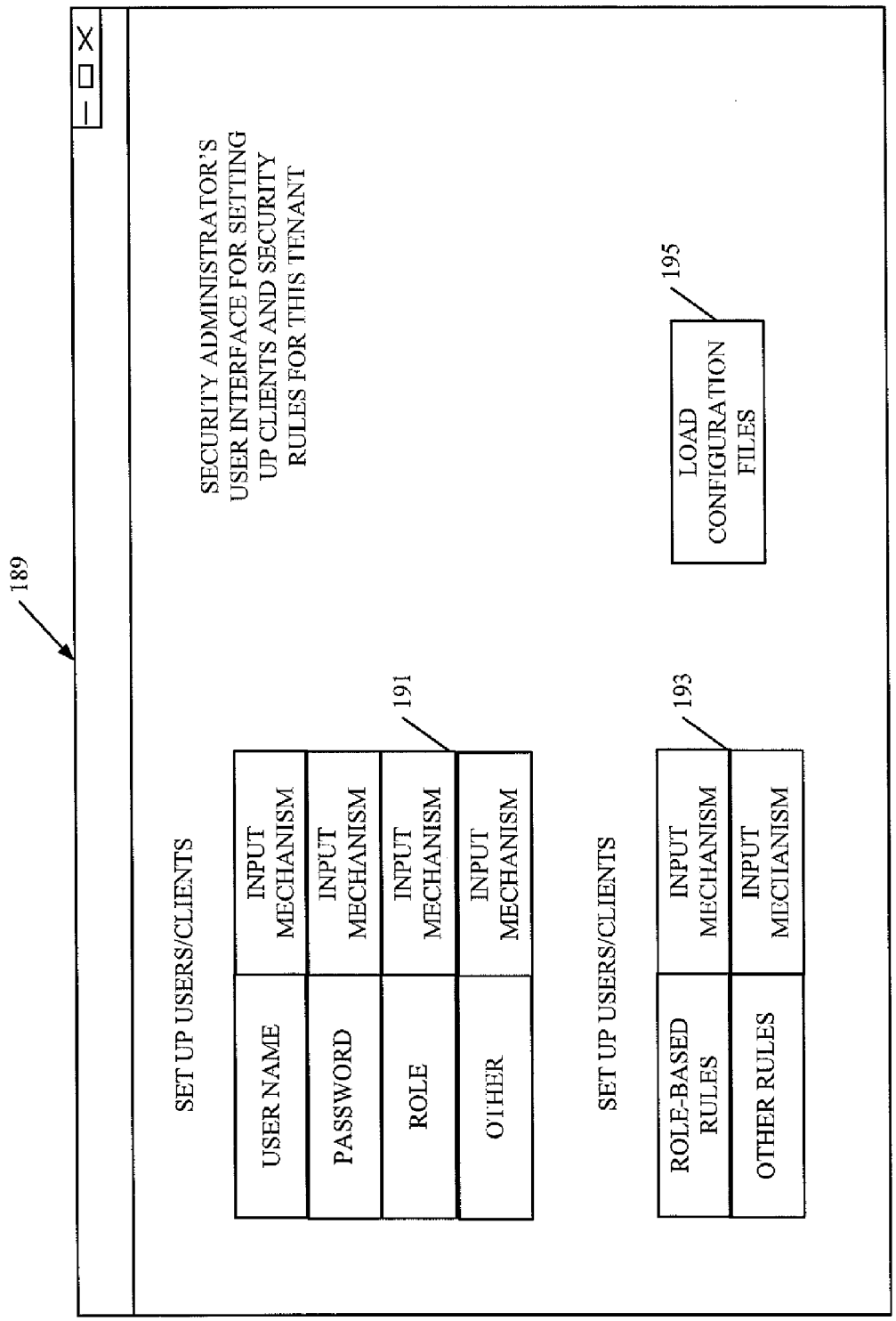

This distributes a security component to client 106 so that client 106 can login and set up other users (such as client 108) that will use tenant 102 to access information in data store 128. The security administrator (now client 106) can also identify the security rules and the roles of each user of tenant 102. FIG. 2D shows one embodiment of a user interface display 189 that allows the security administrator (e.g., now client 106) to do this. The users or clients for the tenant can be set up using user input mechanisms 191, and the security rules can be set up using input mechanisms 193. The security rules roles and users are stored as security rules for each tenant indicated at 134 in FIG. 1. The role information corresponding to client 108, and the fact that client 108 belongs to tenant 102, is stored in a configuration file (or configuration data) 148, corresponding to that client 108. The configuration file can be automatically distributed to the clients or sent when security administrator actuates a user input mechanism, such as mechanism 195 in FIG. 2D.

Figure 2E:
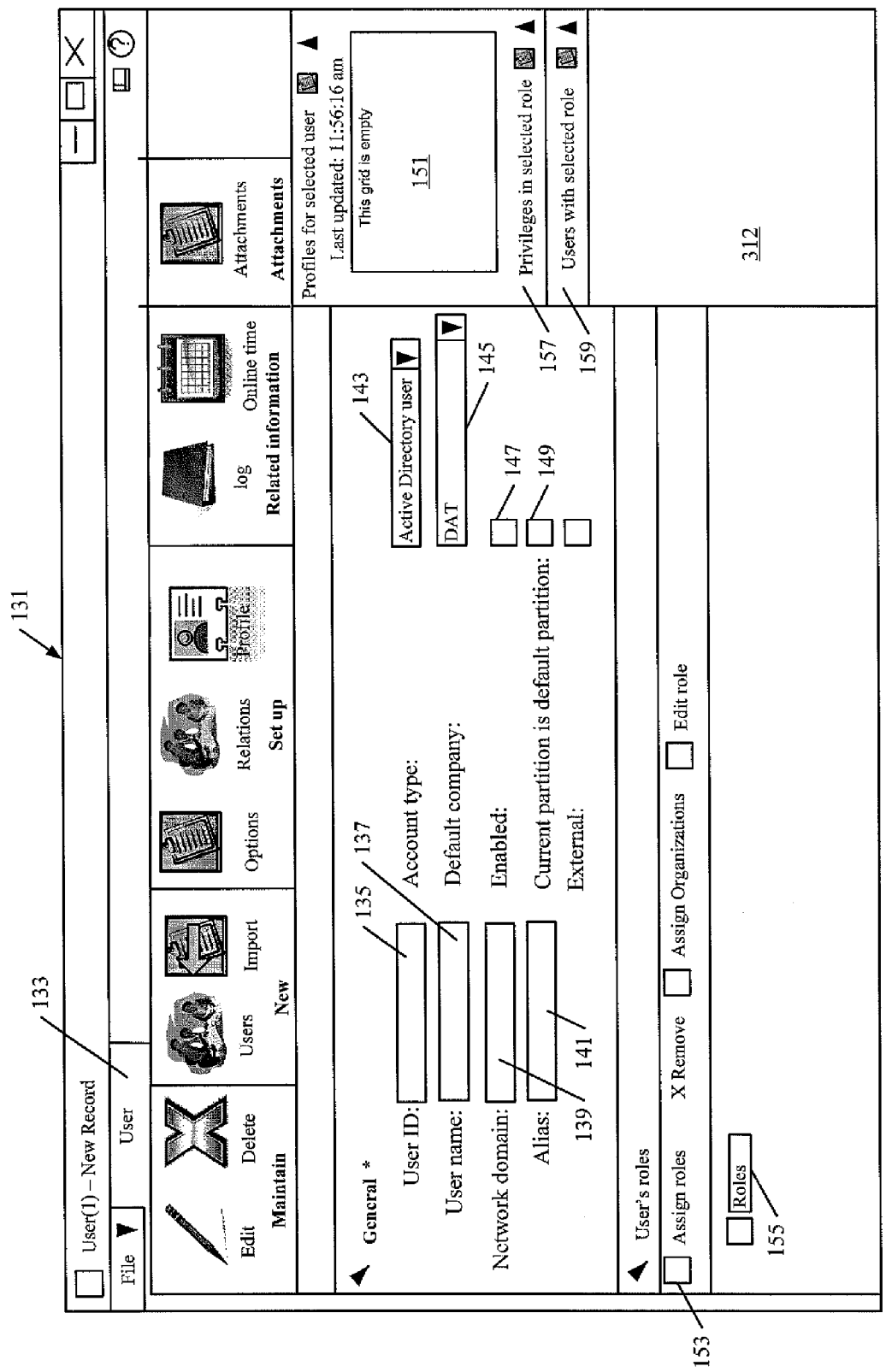

FIG. 2E shows another embodiment of a user interface display 131 that the administrator can use to set up a user on a given tenant. It can be seen that the administrator has selected user tab 133 which allows the administor to type in various information about the user in a set of text boxes, and check boxes. For instance, the administrator can type in a user ID in text box 135, a user name in box 137, a network domain in box 139 and an alias in box 141. The user can also illustratively use a dropdown menu 143 to define an account type and another dropdown menu 145 to select a default company. The administrator can then enable this user by checking check box 147 and the user can assign this user to a default partition by checking box 149.

The administrator can illustratively establish a profile for this user by entering information in box 151. The administrator can also assign one or more roles to this user by actuating button 153. This illustratively brings up a set of roles 155 which can be selected or otherwise assigned to this user by the administrator. Similarly, by actuating dropdown box 157, the administrator can review privileges for the selected role, and by actuating dropdown box 159, the administrator can review other users that have been assigned to the selected role. Of course, user interface display 131 shown in FIG. 2E is illustrative only and other ways of identifying users and assigning roles can be used as well.

When client 108 desires to access information on data store 128 or store information on data store 128, client 108 first logs in to tenant 102. The configuration data 148 indicates to server layer 114 the role of client 108 and which tenant client 108 belongs to. Therefore, when client 108 provides information to be stored on data store 128, for instance, server layer 114 stores that data as tenant data 154 in data store 128. Server layer 114 also illustratively identifies tenant data 154 as being from tenant 102. Thus, server layer 114 identifies all of the tenant data 154, 156 and 158 as being specific to a given tenant. When a client subsequently logs in and asks to access data on data store 128, server layer 114 confines that specific client's access to only the data 154, 156 or 158 that corresponds to the tenant 102 or 104, through which the client has logged in. For instance, if client 110 subsequently logs in through client 104, server layer 114 identifies, through configuration data 150, that client 110 has a given role and has logged in through tenant 104. Therefore, server layer 114 confines the access of client 110 to only data corresponding to tenant 104, given the role of client 110 in tenant 104.

It will also, of course, be noted that system 100 shows each individual tenant 102-104 having its own separate tenant data 154-156. However, it may be that a subset of tenants 102-104 may want their data partitioned from another subset of tenants 102-104. In that case, each subset has its data partitioned by server layer 114 so that it can be accessed by any tenant in that subset. However, it will not be accessible by any tenant outside of that subset. The data is shown partitioned on a tenant-by-tenant basis in FIG. 1 (instead of a subset-by-subset basis) for the sake of example only.

Since it may not be desirable for server layer 114 to make multiple round trips to data store 128, server layer 114 implements cache 130. In order to maintain data isolation even in the in-memory cache 130, server layer 114 establishes a separate copy of the cached data for each tenant in system 100. Therefore, by way of example, cached tenant data 160 is a copy of the cached memory for tenant 102. Cached tenant data 162 is a copy of the cached data for tenant 104, and cached tenant data 164 is a copy of the cached data for another tenant in system 100. Server layer 114 maintains separate copies of cached data 162-164 that correspond to each individual tenant 102-104 in system 100.

It may be that some shared data 166 may be common to all of the tenants 102-104. For instance, shared data 166 may include general information about the parent holding company of each of the tenants. In that case, server layer 114 stores shared data 166 so that it can be accessed by any tenant (or any subset of tenants). Shared data 166 is shown in phantom because it is optional, and in another embodiment, no data is shared among tenants.

A more detailed discussion of the operation of system 100 will now be given. Reference will be made to FIGS. 2-11.

FIG. 2 is a flow diagram illustrating one embodiment of the operation of system 100 in having administrator 133 set up a new tenant. FIG. 2 shows that administrator 133 first logs into the system and administrator component 132 generates a user interface display (such as display 179 in FIG. 2A or display 125 in FIG. 2B) that has user input mechanisms 181, 183, 127 and 129 that allow administrator 133 to create a new tenant or partition. This is indicated by block 170 in FIG. 2. Administrator component 132 then receives inputs from administrator 133 creating a new tenant.

Once the new tenant is created, administrator component 132 displays a user interface display (such as display 185 in FIG. 2C) with user input mechanisms 187 that receive inputs from the administrator 133 that assign another user (such as client 106) as a security administrator for the new tenant (e.g., for tenant 102). Assigning client 106 as the security administrator for tenant 102 is indicated by block 174 in FIG. 2. This causes server layer 114 to allow client 106 to log into the business data system (such as an ERP application) and set up users (e.g., using display 189 shown in FIG. 2D or display 131 in FIG. 2E) for the new tenant 102. This is indicated by block 176 in FIG. 2. For instance, this allows the security administrator (e.g., client 106) to load the configuration files 146-148 for each of the users of tenant 102. Loading the configuration files is indicated by block 178 in FIG. 2. The security administrator can also then assign roles to each of the clients in tenant 102. This is indicated by block 180. Therefore, the security administrator can input various role-based security rules, authentication rules, or other types of security rules, into the business data system and they are accessible at 134 by server layer 114. Of course, the security administrator can perform other tasks as well, and this is indicated by block 182 in FIG. 2.

It may be that, once the new tenant 102 is setup on the business data system, tenant 102 wishes to store business data on data store 128. When that occurs, the configuration data 146-148 for the specific client 106-108 that initiates the data transfer is also included with the request to store data in data store 128.

Server layer 114 then partitions the data of the new tenant 102 in the database implemented on data store 128 by identifying that data as tenant data 154 belonging to tenant 102. Partitioning the data in this way is indicated by block 184 in FIG. 2. Sever layer 114 can do this in a variety of different ways. For instance, server layer 114 can provide a partition identifier on each table in tenant data 154 identifying it as belonging to a specific tenant. Partitioning the data on a table-by-table basis is indicated by block 186 in FIG. 2. In addition, server layer 114 can partition data on each individual row in each table. That is, the server layer can stripe every row of data belonging to tenant 102, in every table belonging to tenant 102, with a partition identifier indicating that the data in that row belongs to tenant 102. Partitioning on a row-by-row basis is indicated by block 188. Server layer 114 can also partition in other ways. For instance, it can arrange the data in the tables in tenant data 154 according to a schema that is only accessible by tenant 102. Partitioning the data in a schema-based fashion is indicated by block 190. Sever layer 114 can partition the data in other ways as well, and this is indicated by block 192.

Figure 3:
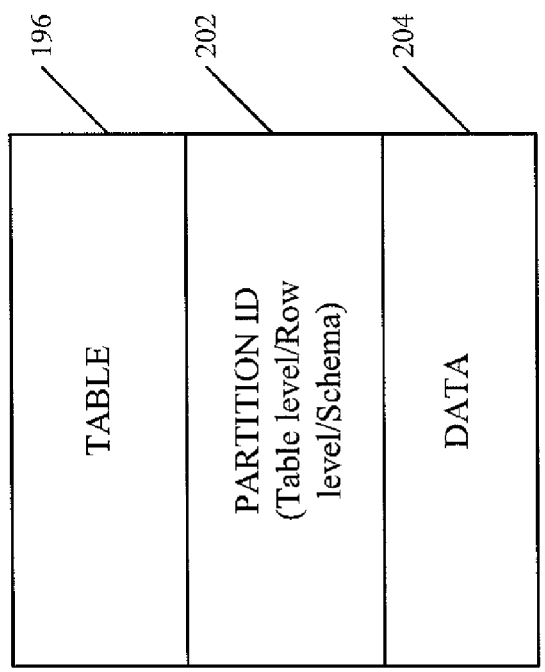
FIG. 3 shows one embodiment of a data structure for partitioned data.
Figure 3:
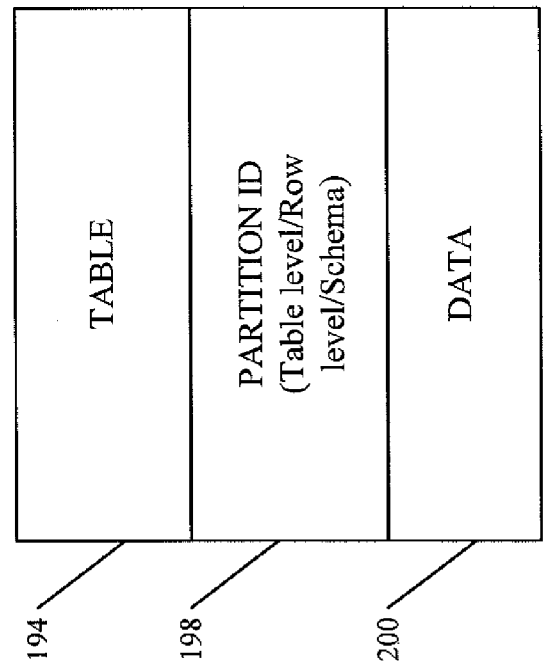

FIG. 3 shows one embodiment of a set of tables 194 and 196 that are illustrative examples of how tenant data 154 and 156 is stored in database 128 for tenants 102 and 104. In the embodiment in FIG. 3, table 194 has a partition identifier that can be on the table level, the row level, or it can be schema based. The partition identifier 198 identifies data 200 as belonging to tenant 102. Similarly, table 196 has a partition identifier 202 that identifies data 204 as belonging to tenant 104. Other ways of partitioning data are contemplated herein as well.

Figure 3C:
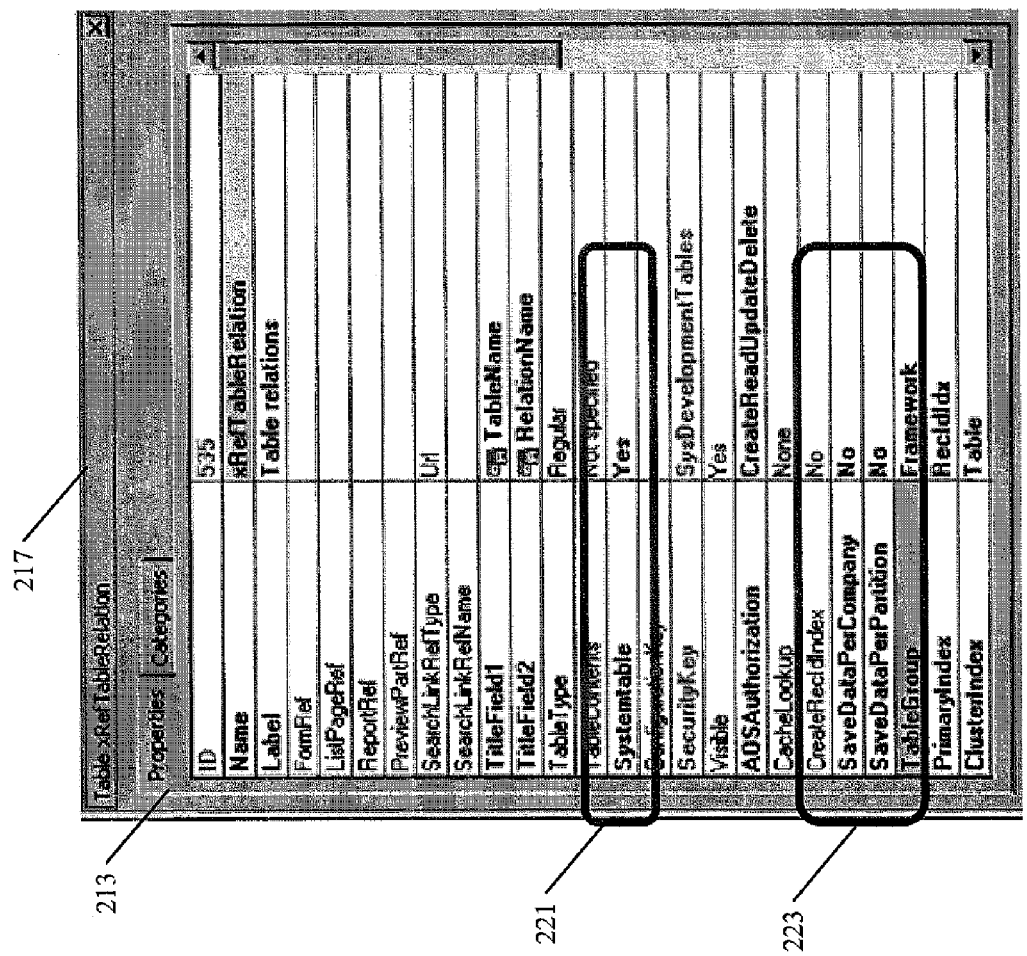

FIGS. 3A-3C show user interface displays that illustrate portioned data inside tables, by way of example. FIG. 3A shows a user interface display 211 that displays properties when the property tab 213 is selected, for a customer table.

Various properties are illustrated and those outlined by box 215 show that the data is partitioned not only based on a partition identifier, but also on a per-company basis. Therefore, a tenant accessing the data must not only belong to the relevant partition, but must belong to the relevant company as well.

FIG. 3B shows user interface display 217 that illustrates properties for a different table. The box 215 now shows that the data is partitioned based on a partition identifier only. That is, any tenant assigned to the relevant partition can access the illustrated table. Therefore, subsets of companies (for example) can access the same data.

FIG. 3C shows user interface display 219 that shows properties for yet another table. Properties for the table shown in user interface display 219 within box 221 illustrate that the table includes system data. By indicating that the table is neither partitioned on a per-company basis or a per-partition basis, and by indicating that it belongs to a framework table group, the properties in box 223 show that the table contains shared data which is shared among the system.

Figure 4:
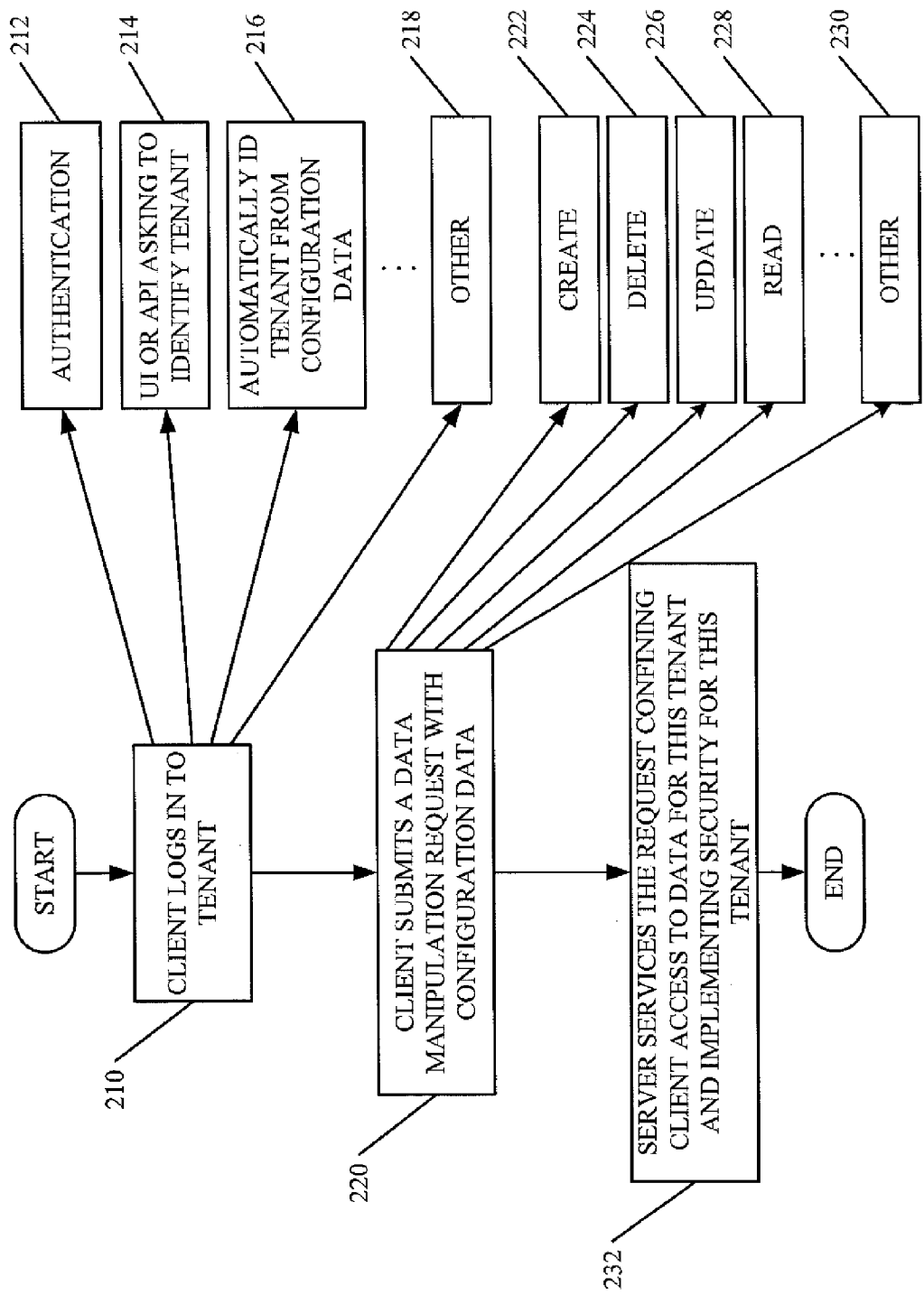
FIG. 4 is a flow diagram illustrating one embodiment of the overall operation of the system shown in FIG. 1 in hosting multi-tenant access to business data.

FIG. 4 illustrates one embodiment of the operation of system 100 in allowing tenant 102 to perform a data manipulation request on data store 128. In one embodiment, client 108 logs in to tenant 102. This is indicated by block 210 in FIG. 4. Client 108 does this by going through an authentication procedure established when the security administrator of tenant 102 sets up client 108. Authentication is indicated by block 212 in FIG. 4. Server layer 114 then determines the specific tenant to which client 108 belongs. This can be done in a wide variety of different ways. For instance, server layer 114 can provide a user interface display that asks client 108 to verify the tenant to which client 108 belongs. Similarly, server layer 114 can expose an application programming interface that client 108 writes to, to identify the particular tenant that client 108 belongs to. This is indicated by block 214 in FIG. 4. Of course, client 108 can automatically provide the configuration data 148 to server layer 114 as well, and the configuration data illustratively contains not only the role of client 108 for tenant 102, but the identity of tenant 102 through which client 108 has logged into the system. This is indicated by block 216 in FIG. 4. Server layer 114 can use other ways of identifying the particular tenant 102 that client 108 belongs to as well, and this is indicated by block 218 in FIG. 4.

Once logged in through a tenant, client 108 submits a data manipulation request, and the configuration data 148 is sent along with that request. This is indicated by block 220 in FIG. 4. The data manipulation request can be any sort of request to manipulate or add data in database 128. For instance, the data manipulation request can create new data to be stored in database 128 as indicated by block 222 in FIG. 4. The request can be a request to delete data from data store 128, as indicated by block 224. It can be a data modification request to update data in data store 128. This is indicated by block 226. It can also simply be a request to retrieve and read data in data store 128, as indicated by block 228. Of course, the data manipulation request could be any other sort of request as well, and this is indicated by block 230.

Server layer 114 then reads the configuration data submitted, along with the request, to determine the particular tenant 102 to which client 108 belongs, and also to determine (for example) the role that client 108 holds in tenant 102. Server layer 114 then services the data manipulation request by confining the access that client 108 has to data in store 128 to the data for the particular tenant 102, that is identified in configuration data 148. Server layer 114 also illustratively accesses the security rules 134 for tenant 102, to identify the role of client 108, and implements security according to those rules. Serving the request using only the corresponding tenant data, and implementing security for that tenant, is indicated by block 232 in FIG. 4.

Figure 5:
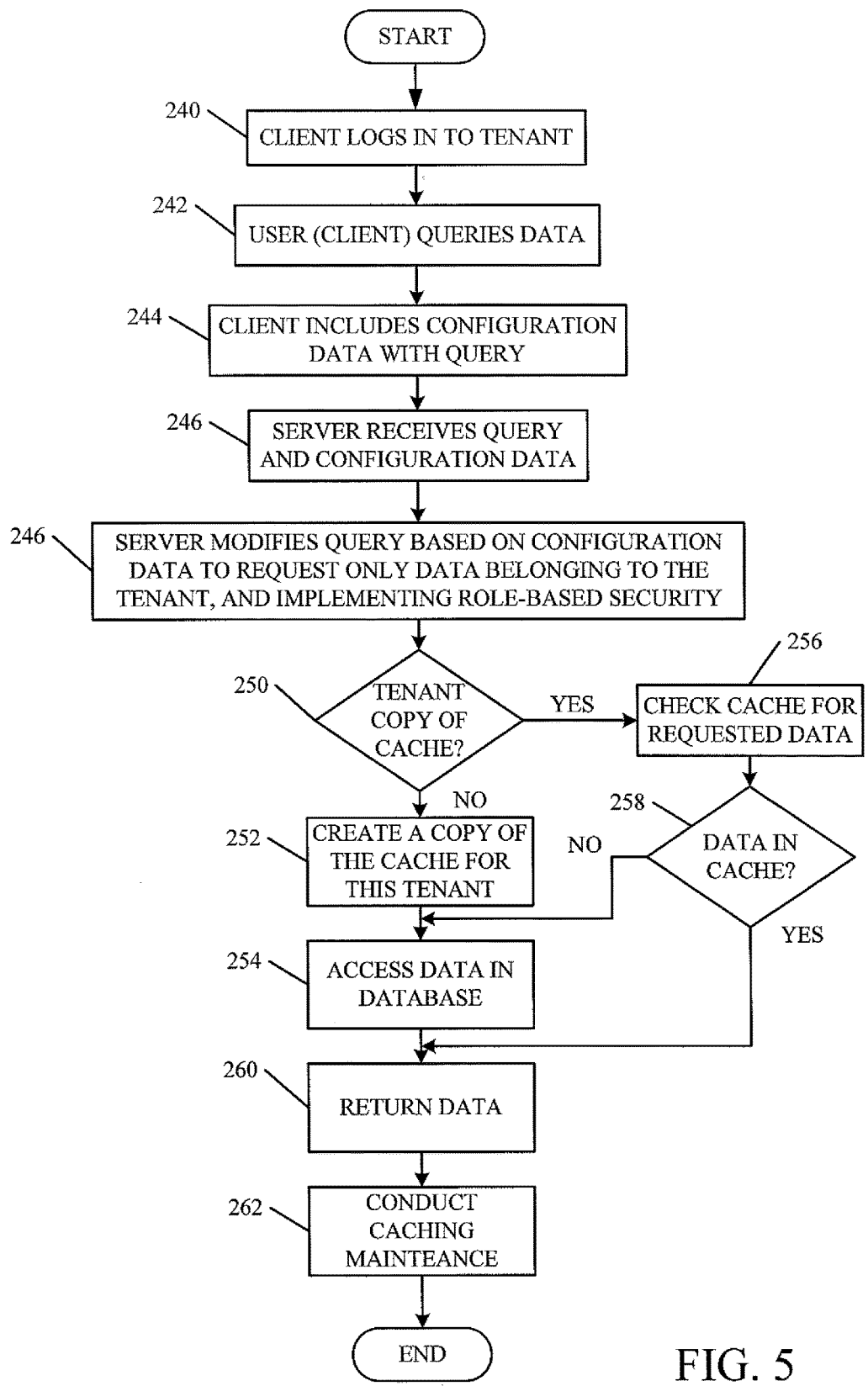
FIG. 5 is a flow diagram illustrating one embodiment of the operation of the system shown in FIG. 1 in providing data access and caching operations.

In order to illustrate the operation of system 100 in more detail, FIG. 5 is a flow diagram illustrating a specific data accessing request that is submitted by client 108 to obtain data from data store 128. Again, client 108 illustratively logs into tenant 102 using authentication or other desired login procedures. This is indicated by block 240 in FIG. 5. The client 108 then submits a query for tenant data in data store 128. This is indicated by block 242 in FIG. 5. The query, if unconfined, might encompass tenant data for other tenants in store 128. For instance, if the query is seeking all sales leads generated in the month of November, that query would encompass tenant data for all tenants in database 128. The client 108 sends configuration data 148, along with the query, to server layer 114. This is indicated by block 244 in FIG. 5. The server layer 114 receives the query and the corresponding configuration data, as indicated by block 246. Server layer 114 examines the configuration data 148 to determine which tenant the query originated from and the role that client 108 holds in the tenant. Server layer 114 then modifies the query based on the configuration data to request only data belonging to tenant 102, and implementing role based security (or other security defined by the security rules 134) for tenant 102. This is indicated by block 148 in FIG. 5. Server layer 114 effectively confines the data request to encompass only data belonging to the tenant that client 108 belongs to (in this case, client 102).

In one embodiment, server layer 114 determines whether it can service the data request out of cache 130. In doing so, server layer 114 first determines whether there is actually a copy of cached tenant data 160 for this particular tenant 102. This is indicated by block 250 in FIG. 5. If not, then server layer 114 creates a copy of the cache for tenant 102, as indicated by block 252, and then accesses data store 128 to obtain the requested data. This is indicated by block 254.

If, however, server layer 114 determines at block 250 that there is a copy of the cache for tenant 102, then server layer 114 checks that cached tenant data for the requested data. This is indicated by block 256 in FIG. 5. If server layer 114 can service the request out of the cache 130, then it does so. However, if it cannot, then it must also access data in database 128. Determining whether the request can be serviced from cache 130 is indicated by block 258 in FIG. 5.

In either case, whether server layer 114 has obtained the data from cache 130 or data store 128, the data that is responsive to the query is returned to client 108 in tenant 102. This is indicated by block 260 in FIG. 5. Server layer 114 then conducts any other desired caching operations. For instance, if new data has been retrieved from data store 128 (which is not in the tenant's copy of the cache), then server layer 114 adds that data to the cached tenant data for tenant 102. Of course, server layer 114 can update the tenant's copy of the cache in other ways as well, and conducting the caching operations to maintain cache 130 is indicated by block 262 in FIG. 5. Thus, server layer 114 not only partitions database 128 so it can store data for multiple tenants (in a secure and partitioned way), but it controls cache 130 so it can do the same thing. Each copy of the cached data is marked as belonging to a given tenant and no other tenant can access that copy of the cached data. It is maintained separately, and it is partitioned, from other tenant's cached data.

Figure 5A:
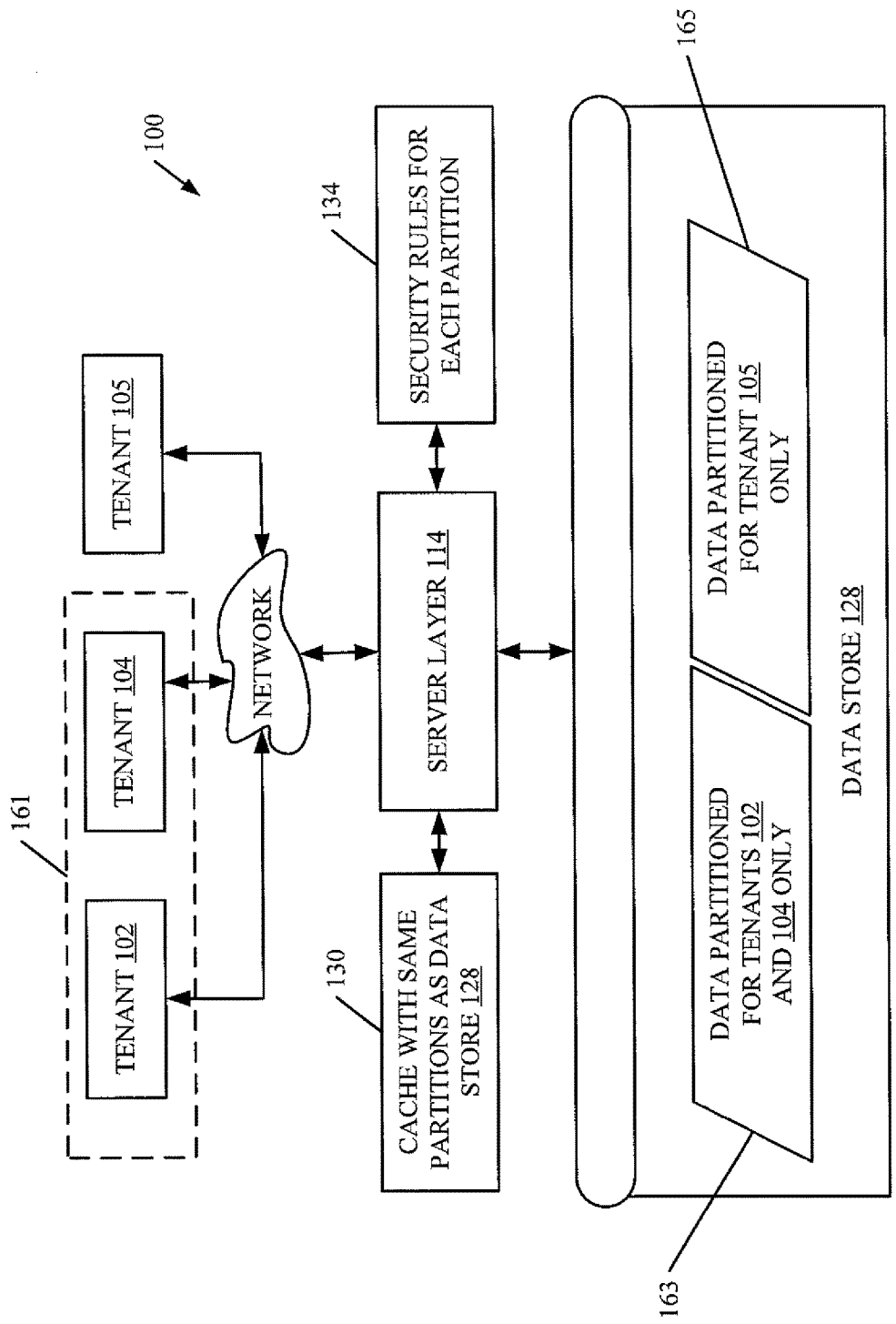
FIG. 5A shows an architecture in which the data store is partitioned so subsets of tenants share data.

FIG. 5A shows another embodiment in which a subset of tenants are partitioned together, but separate from other tenants. FIG. 5A shows system 100, which is similar to that shown in FIG. 1, and similar items are similarly numbered. However, system 100 in FIG. 5A shows that tenants 102 and 104 are illustratively two businesses that are grouped together as a subset 161. Therefore, the tenants of subset 161 desire to have access to each other's data, but they desire to have that data separated, and isolated from, the data for additional tenants, such as tenant 105. The administrator thus assigns both tenants 102 and 104 to the same partition. In that way, server layer 114 will store the data 163, that is partitioned for tenants 102 and 104 so that both tenants 102 and 104 can access all of that data. However, data 163 is partitioned separately from data 165, which is assigned to a partition for tenant 105. Thus, tenant 105 does not have access to data 163 and the subset 161 of tenants 102 and 104 does not have access to data 165.

It will be noted that, in one embodiment, cache 130 is also separately partitioned, in the same way as data store 128. Therefore, cache 130 includes a separate copy of cached data for the subset 161 of tenants 102 and 104, as well as a separately partitioned copy of cached data for tenant 105. Thus, the cache 130 is partitioned in the same way as data store 128 so that any data requested from cache 130 will be partitioned in the same way as well.

It will also be noted that the business data discussed herein can include a wide variety of business data such as customer records, sales orders, vendors, leads, proposals, quotes, sales data, product data, location data, company financial and marketing data and strategies, personal data, wage or other human resource information, etc. Other business data or business records can be used as well.

Figure 6:
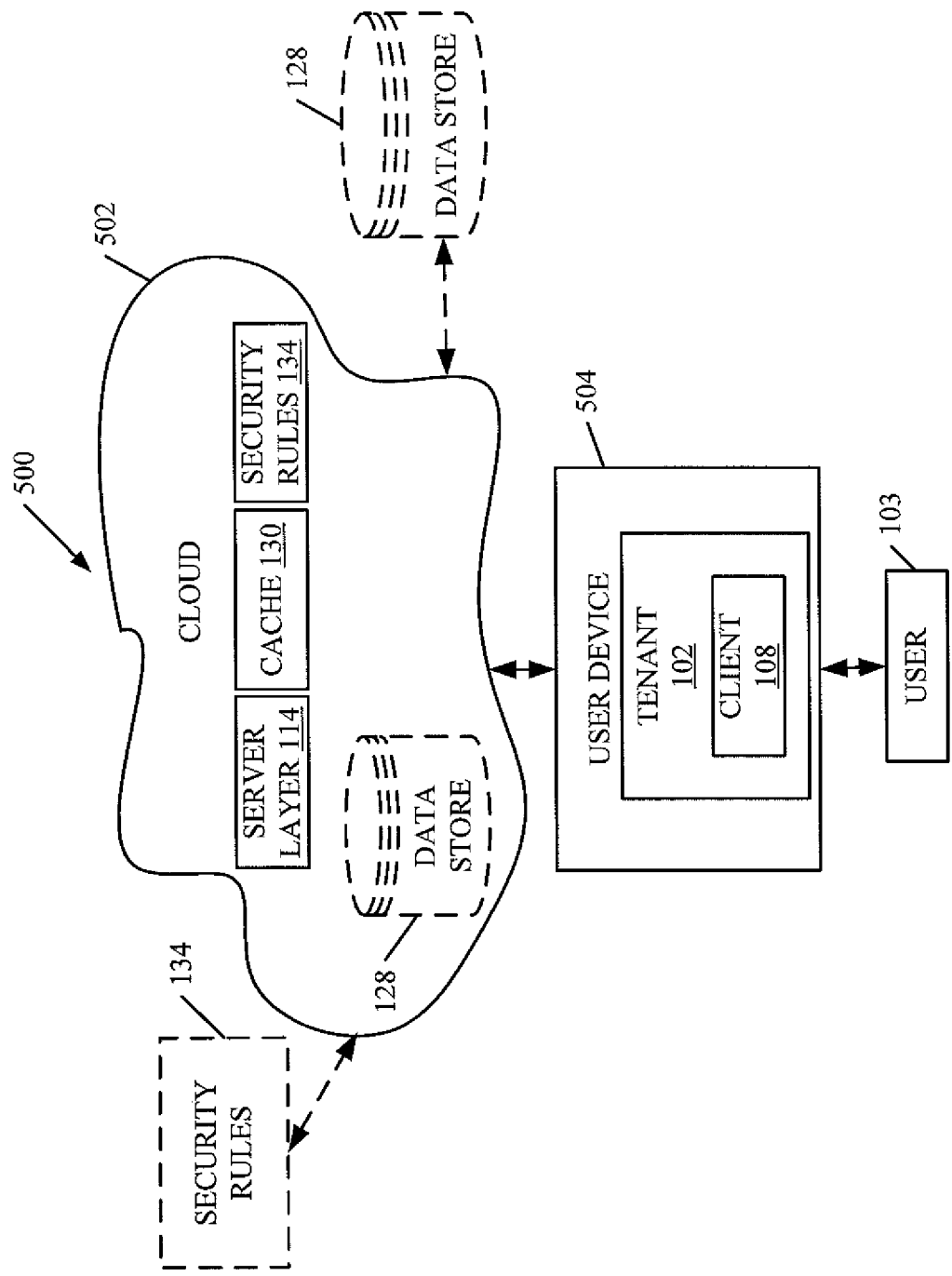
FIG. 6 is a block diagram showing one embodiment of the system in FIG. 1 in various architectures.

FIG. 6 is a block diagram of system 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that server layer 114, data store 128, cache 130 and security rules 134 are located in cloud 502 (which can be public, private, or a combination where portions are public while others are private). Therefore, a client 108 (or user 103) in tenant 102 uses a user device 504 to access those systems through cloud 502.

FIG. 6 also depicts another embodiment of a cloud architecture. FIG. 6 shows that it is also contemplated that some elements of system 100 are disposed in cloud 502 while others are not. By way of example, data store 128 can be disposed outside of cloud 502, and accessed through cloud 502. In another embodiment, security rules 134 are also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
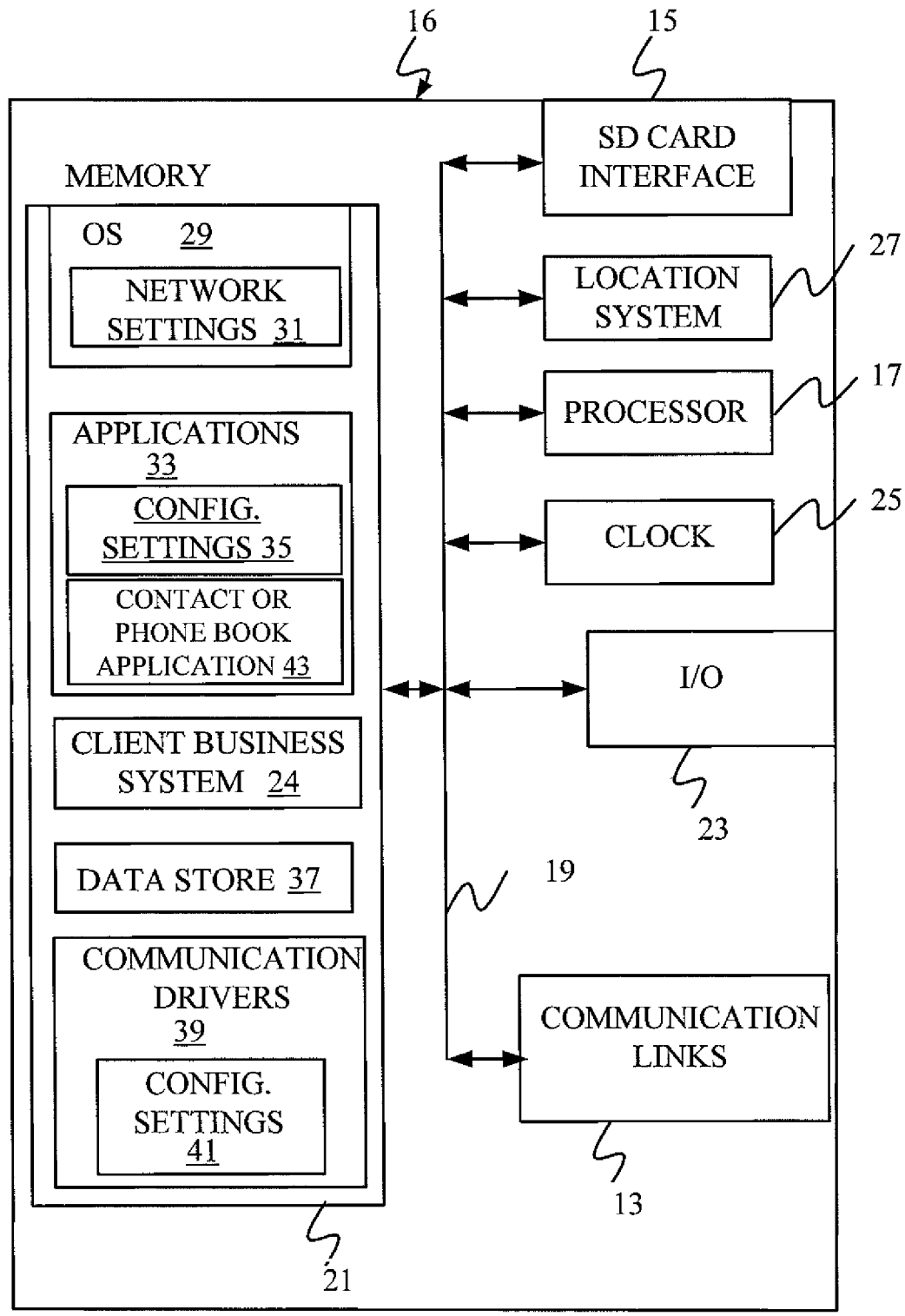
FIGS. 7-10 illustrate various embodiments of mobile devices.
Figure 8:
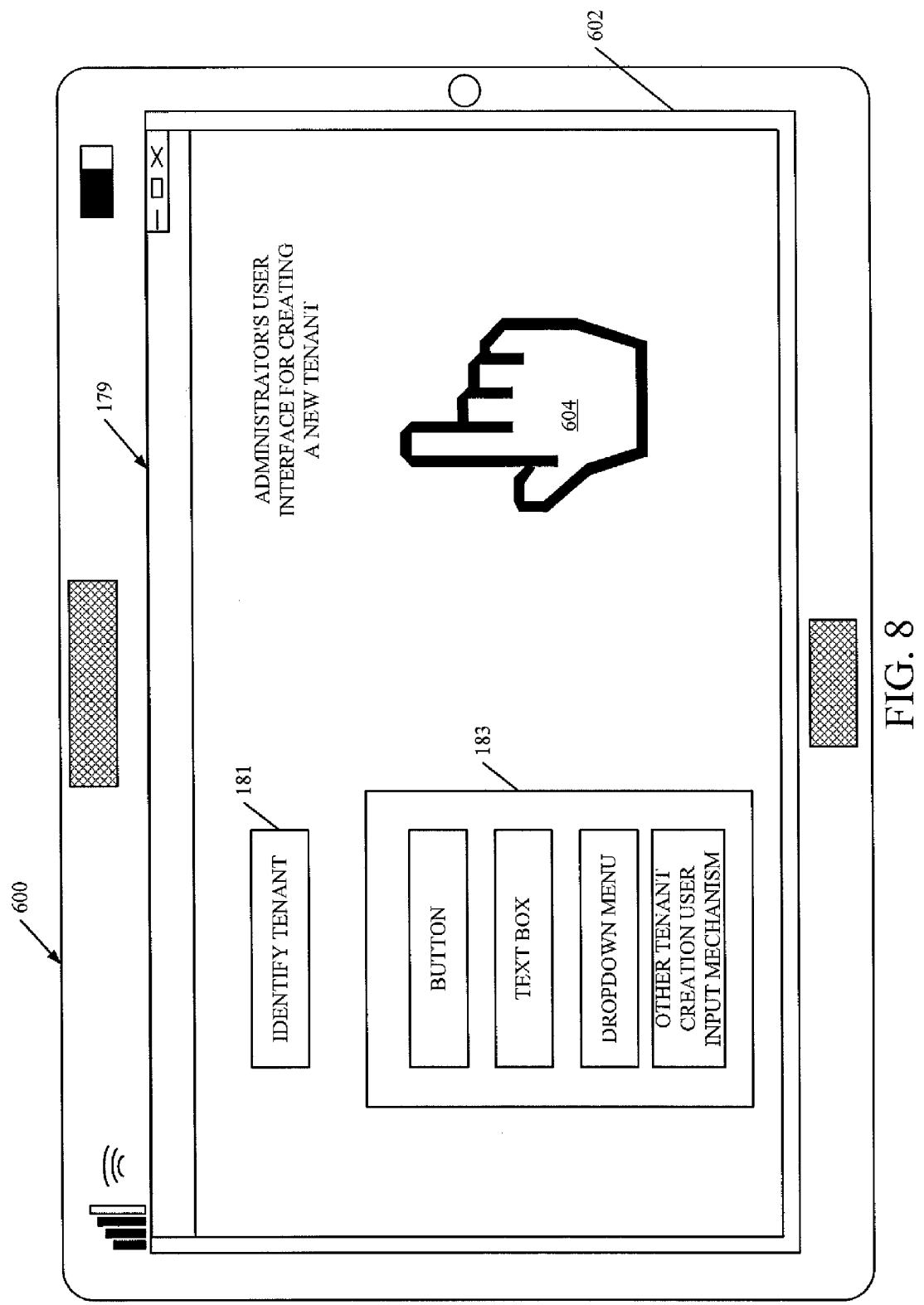
Figure 9:
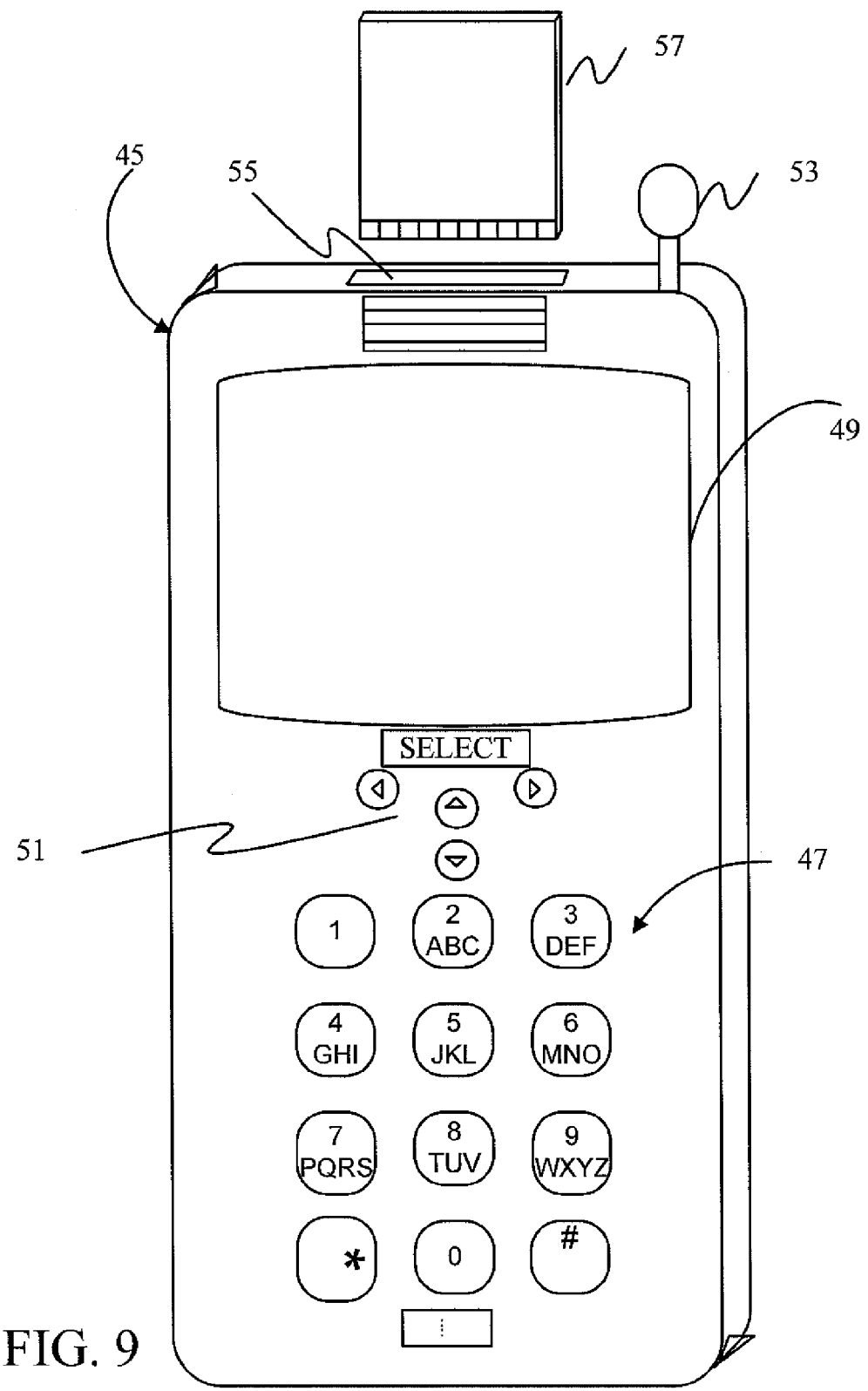
Figure 10:
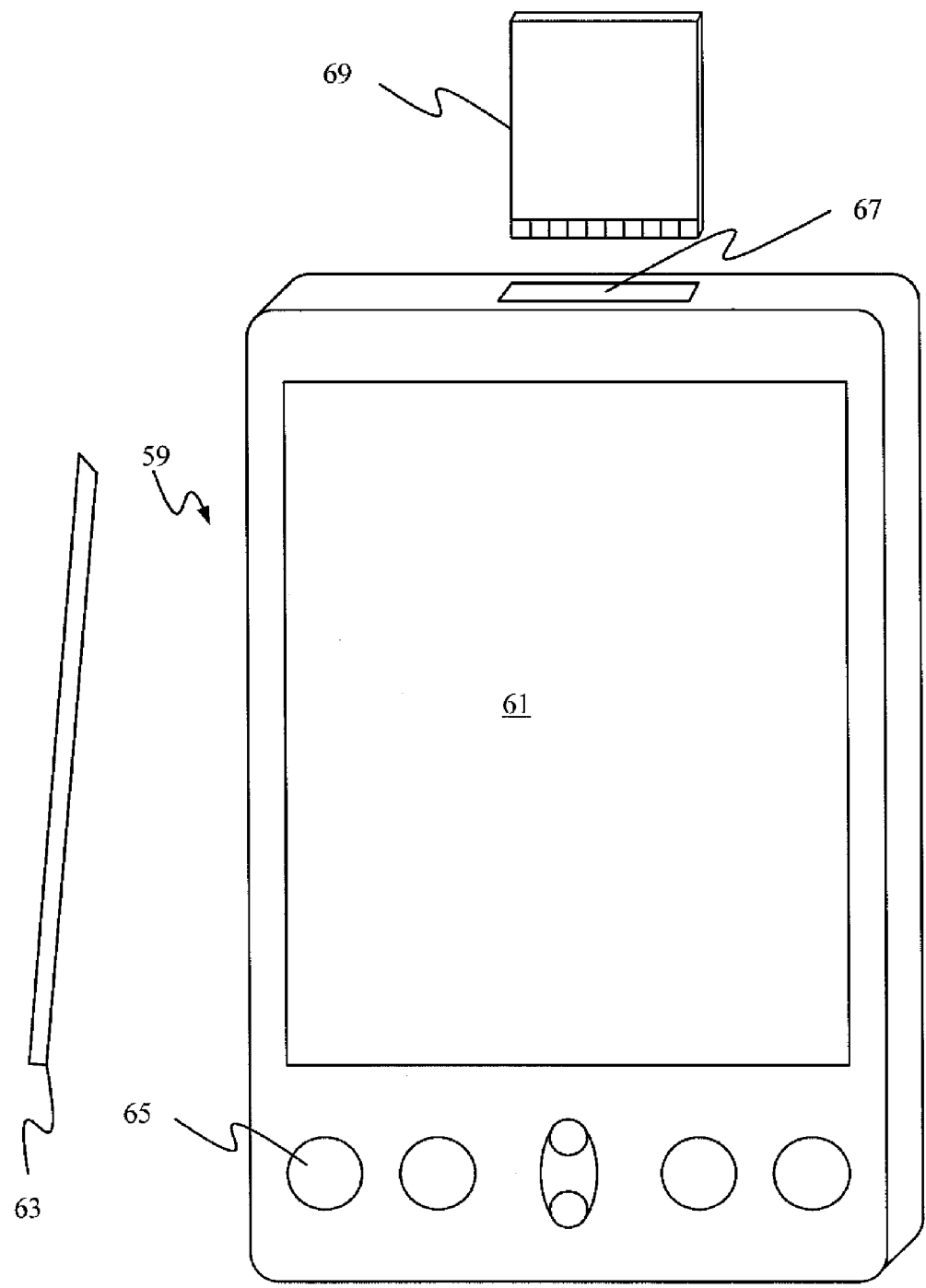

FIG. 7 is a simplified block diagram of one illustrative embodiment of a handheld or mobile computing device that can be used as a user's or client's hand held device 16, in which the present system (or parts of it) can be deployed. FIGS. 8-10 are examples of handheld or mobile devices.

FIG. 7 provides a general block diagram of the components of a client device 16 that can run components of system 100 (such as tenants or clients or other components) or that interacts with system 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like the ERP application of system 100) are received on a removable Secure Digital (SD) card that is connected to a SD card interface 15. SD card interface 15 and communication links 13 communicate with a processor 17 (which can also embody processors 136 or 138 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 128 or cache 130, for example, can reside in memory 21. Similarly, device 16 can have a client business system 24 which can run various business applications or embody parts or all of business system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 8, computer 600 is shown with user interface display 179 (used to create a new tenant) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIGS. 9 and 10 provide additional examples of devices 16 that can be used, although others can be used as well. In FIG. 9, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 11:
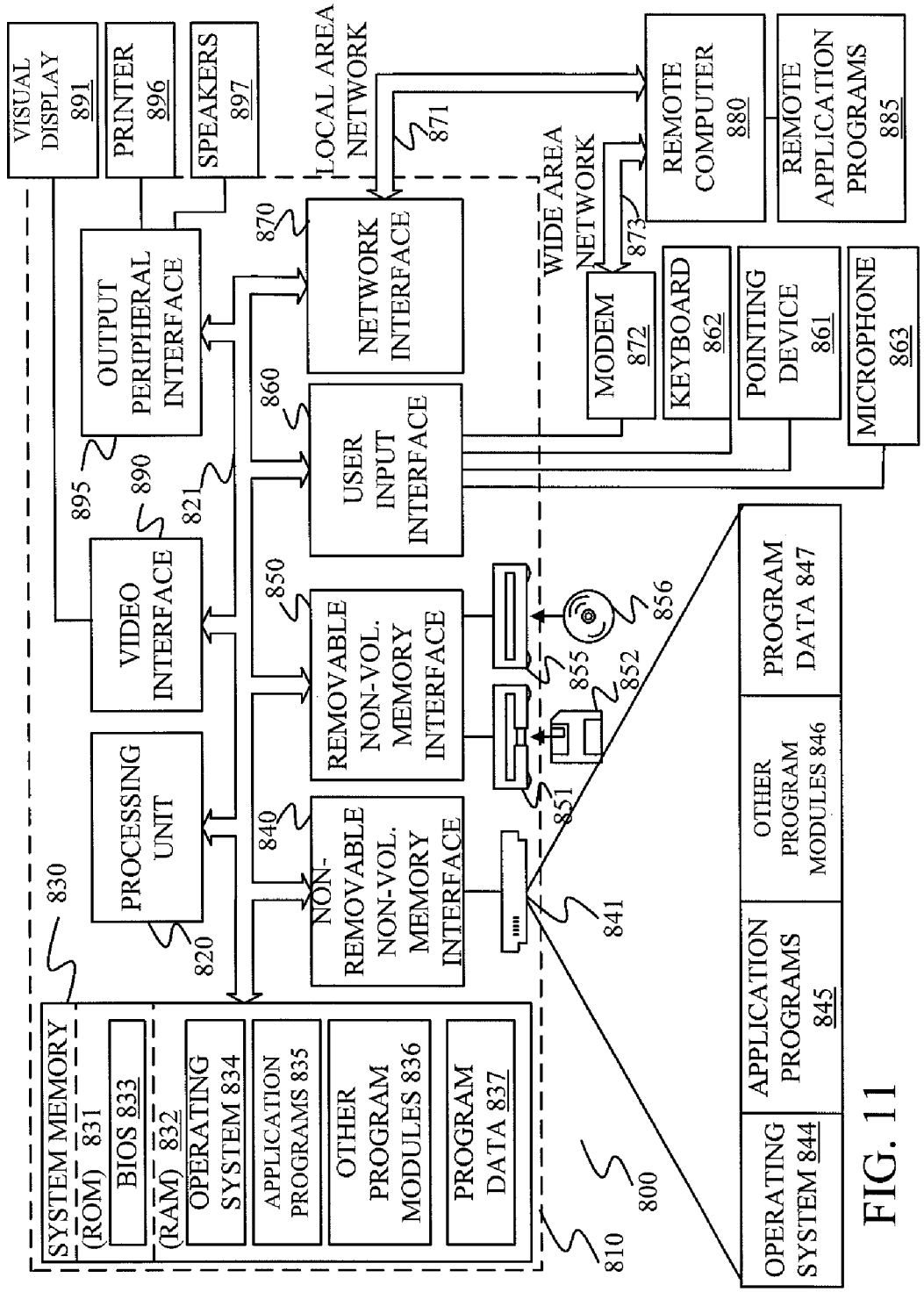
FIG. 11 shows a block diagram of one illustrative computing environment.

FIG. 11 is one embodiment of a computing environment in which system 100 (for example) can be deployed. With reference to FIG. 11, an exemplary system for implementing some embodiments includes a general-purpose computing device in the form of a computer 810. Components of computer 810 may include, but are not limited to, a processing unit 820 (which can comprise the processors for the servers or the tenants), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of servicing a data manipulation request in a multi-tenant data store, each tenant being an organization with multiple users, comprising:

displaying a tenant creation administrator display with user input mechanisms that receive user inputs to create a given tenant in a business data application that has at least one other tenant, other than the given tenant;

displaying a security administrator designation display with user input mechanisms that receive user inputs identifying a client at the given tenant as a security administrator that identifies security rules for users associated with the given tenant;

receiving a data manipulation request, in the business data application, from a requesting client including tenant identification data identifying the requesting client as being from the given tenant; and servicing the data manipulation request, using a computer processor, from the multi-tenant data store that stores first data in association with the given tenant and second data in association with the at least one other tenant, the first data for the given tenant being partitioned in the multi-tenant data store from the second data for other tenants, based on the associations, to restrict access to the first data by the at least one other tenant, the data manipulation request being serviced by confining the data manipulation request to data stored in association with the given tenant, based on the tenant identification data.

2. The computer-implemented method of claim 1 wherein receiving the data manipulation request comprises:
receiving a request to store data on the multi-tenant data store.

3. The computer-implemented method of claim 2 wherein servicing the data manipulation request comprises:
storing the data in the request in the multi-tenant data store; and
marking the data stored in the multi-tenant data store with a partition identifier indicating that the data belongs to the given tenant.

4. The computer-implemented method of claim 3 wherein marking the data comprises:
marking each of one or more tables containing the data in the multi-tenant data store with the partition identifier.

5. The computer-implemented method of claim 4 wherein each table has at least one row, and marking each of the one, or more tables comprises:
marking each row in each table with the partition identifier.

6. The computer-implemented method of claim 1 wherein the data manipulation request identifies data in the multi-tenant data store to be accessed, the identified data being defined to include data from one or more of the other tenants.

7. The computer-implemented method of claim 6 wherein servicing the data manipulation request comprises:
modifying the data manipulation request to obtain a modified data manipulation request that defines only data belonging to the given tenant; and
servicing the modified data manipulation request.

8. The computer-implemented method of claim 7 wherein receiving a data manipulation request comprises:
receiving a query for data that encompasses data from one or more of the other tenants.

9. The computer-implemented method of claim 8 wherein modifying the data manipulation request comprises:
modifying the query to return only data identified by the partition identifier as belonging to the given tenant.

10. The computer-implemented method of claim 1 and further comprising:
receiving, from the security administrator, security rules to be implemented for the given tenant; and
storing the security rules.

11. The computer-implemented method of claim 10 wherein receiving security rules comprises:
displaying a security rules display with user input mechanisms; and
receiving the security rules through the user input mechanisms on the security rules display.

12. The computer-implemented method of claim 10 wherein servicing the data manipulation request comprises:
accessing the security rules for the given tenant, based on the tenant identification data in the data manipulation request; and
implementing the security rules for the given tenant while servicing the data manipulation request.

13. The computer-implemented method of claim 12 wherein receiving the security rules comprises:
receiving role-based security rules.

14. The computer-implemented method of claim 1 wherein servicing the data manipulation request comprises:
maintaining a separate copy of cached data, in cache memory, for each tenant.

15. The computer-implemented method of claim 14 wherein the data manipulation request comprises a query requesting data, and wherein maintaining a separate copy of cached data comprises:
storing the requested data in a cache memory that stores only cached data for the given tenant.

16. A business data system, comprising:
a server layer that hosts a same business data application for a first tenant and a second tenant, each tenant being an organization with a plurality of different clients, the server layer configured to:
receive first data from the first tenant and second data from the second tenant,
store the first and the second data on a multi-tenant data store, and
partition the first data from the second data so the first data is inaccessible to the second tenant and the second data is inaccessible to the first tenant; and
a computer processor that forms a functional part of the system and that is activated by, and facilitates the functionality of, the server layer.

17. The business data system of claim 16 wherein the server layer is disposed in a cloud of a cloud architecture.

18. The business data system of claim 16 wherein the server layer receives configuration data from the first and second tenant and stores the first data, marking it with a partition identifier based on the configuration data that identifies the first data as being accessible only to the first tenant.

19. The business data system of claim 18 and further comprising:
a cache memory, the server layer maintaining the cache memory so it has a first copy of cached data corresponding to the first tenant and a second copy of cached data corresponding to the second tenant, the first and second copies of cached data being partitioned from one another in the cache memory so the first copy of cached data is inaccessible to the second tenant and the second copy of cached data is inaccessible to the first tenant.

20. A computer readable storage medium, storing computer readable instructions which, when executed by a computer, cause the computer to perforin a method, comprising:
organization with multiple users, comprising:
displaying a tenant creation administrator display with user input mechanisms that receive user inputs to create a given tenant in a business data application that has at least one other tenant, other than the given tenant;
displaying a security administrator designation display with user input mechanisms that receive user inputs identifying a client at the given tenant as a security administrator;
receiving a data manipulation request, in the business data application, from a requesting client including tenant identification data identifying the requesting client as being from the given tenant and identifying data to be manipulated; and
servicing the data manipulation request, using the business data application, from the multi-tenant data store that stores data for the given tenant and the at least one other tenant in, the data for the given tenant being partitioned in the multi-tenant data store from data for other tenants, the data manipulation request being serviced by confining the data manipulation request to data for the given tenant, based on the tenant identification data, wherein servicing the data manipulation request further comprises:

accessing security rules for the given tenant, based on the tenant identification data in the data manipulation request;

implementing the security rules for the given tenant while servicing the data manipulation request; and maintaining a separate copy of cached data in cache memory, based on the data identified in the data manipulation request, for each tenant.

* * * * *